(12) United States Patent
Putilin

(10) Patent No.: US 6,429,913 B2
(45) Date of Patent: Aug. 6, 2002

(54) SYSTEM AND METHOD FOR THE MANUFACTURE OF A UNIVERSAL REFLECTIVE-TRANSMISSIVE DISPLAY

(75) Inventor: Andrey N. Putilin, Moscow (RU)

(73) Assignee: NeurOK, LLC, Arlington, VA (US)

( * ) Notice: Subject to any disclaimer, the term of this patent is extended or adjusted under 35 U.S.C. 154(b) by 0 days.

(21) Appl. No.: 09/747,405

(22) Filed: Dec. 22, 2000

Related U.S. Application Data

(60) Provisional application No. 60/171,884, filed on Dec. 23, 1999.

(51) Int. Cl.[7] .................... G02F 1/1357; G02B 5/32; F21V 8/00
(52) U.S. Cl. .................... 349/62; 349/65; 349/68; 359/15
(58) Field of Search .................... 349/62, 63, 64, 349/65, 68, 113; 359/15, 34, 599; 362/26, 29, 30; 385/901

(56) References Cited

U.S. PATENT DOCUMENTS

| 5,418,631 A | 5/1995 | Tedesco .................... 359/15 |
| 5,659,408 A | 8/1997 | Wenyon .................... 359/15 |
| 5,703,667 A | 12/1997 | Ochiai .................... 349/65 |
| 5,724,111 A | 3/1998 | Mizobata et al. .................... 349/112 |
| 5,745,203 A | 4/1998 | Valliath et al. .................... 349/113 |
| 5,748,828 A | 5/1998 | Steiner et al. .................... 385/146 |

FOREIGN PATENT DOCUMENTS

WO 97/13175 4/1997

Primary Examiner—William L. Sikes
Assistant Examiner—Tai V. Duong
(74) Attorney, Agent, or Firm—Hogan & Hartson LLP

(57) ABSTRACT

A holographic universal display according to the present invention uses reflective lighting for a liquid-crystal panel. The system comprises at least two waveguide holograms in a matched configuration that redirects incident light beams as diffracted beams so that the beams passing out of the display are targeted towards the viewer. That is to say, light beams that are incident to the display at large angles, over a wide range, with respect to normal are redirected into a set, narrow range of angles close to the required angle for optimal viewing. The required angle for optimal viewing is nominally perpendicular to the plane of the display (i.e., normal), but is optionally selectable (by design of the holograms) to be an angle varies from the strict perpendicular.

8 Claims, 7 Drawing Sheets

SYSTEM AND METHOD FOR THE MANUFACTURE OF A UNIVERSAL REFLECTIVE-TRANSMISSIVE DISPLAY

CROSS REFERENCE TO RELATED APPLICATIONS

This application claims priority under 35 U.S.C. §119(e) from provisional application No. 60/171,884, filed Dec. 23, 1999. The 60/171,884 provisional application is incorporated by reference herein, in its entirety, for all purposes.

BACKGROUND OF THE INVENTION

This invention relates generally to optical systems that employ holograms as the optical elements. More particularly, the present invention relates to a liquid-crystal display (LCD) that employs holograms to provide backlighting per operation in either a reflection mode or a transmission mode.

Modern reflective displays are intended for the image to be viewed with a source of light positioned "behind the back" of the person viewing the display. When the angle of incidence of the ambient light source is oblique, i.e. "in front of the viewer", the image appears to be blind with shade covering a part of the image.

It has been proposed to use reflection holograms for the improvement of the reflectance of the reflective display that contains a liquid-crystal panel combined with a holographic diffuser (positioned behind the panel) and a reflecting layer. However, such a holographic diffuser does not resolve the shade problem that occurs with light having an oblique angle of incidence. In addition, this approach does not provide the reflective mode for the whole spectrum of white light (for the color displays and for the black-and-white displays of the "white paper" type). For further details, refer to U.S. Pat. No. 5,659,408 issued to Wenyon.

Certain displays operate in the reflective mode and contain a dielectric backing with an applied polyamide insulating layer and an electrode system, which provide the diffuse reflection of light, a liquid-crystal layer, which changes its properties if the voltage is applied to the electrode system, and a coating equipped with a system of relevant transparent electrodes and given light-diffusing properties. The light is reflected directly from the bottom electrode of each liquid-crystal cell so that the display could operate in the reflective mode given a wide spectrum of incidence angles. It is quite different from the conventional external reflector which, in its turn, operates effectively in the narrow spectrum of incidence angles close to the perpendicular to (i.e., the normal angle with respect to) the reflective display plane. This type of reflective display does not operate in the transmission mode. Furthermore, the manufacturing technology germane to such a display is very different from the conventional and cheap technology of the transmission-based liquid-crystal displays.

Another weakness of this type of reflective display is its isotropism (i.e., even diffusion in all directions) when diffusion perpendicular to the display plane (i.e., toward the viewer of the display) would be preferred. In addition, the angles of reflection of light from the refractory electrode are symmetric to the angles of incidence with respect to the perpendicular to the display plane (i.e., they are specular). On the other hand, an asymmetric scheme wherein light incident at oblique angles (e.g., say from 30 to 70 degrees) is reflected at angles that are close to the perpendicular (e.g., +/−15 degrees with respect to normal angle) would be preferable.

It has also been proposed for an LCD display to employ a holographic diffuser for the backlighting of the liquid-crystal panels. Such a display contains a flat plate made out of a translucent material that is used as a waveguide, a reflective or transmissive hologram applied to the waveguide surface, a reflective layer applied to another surface of the waveguide, and a liquid-crystal panel operating in the transmission mode. For further details, refer to U.S. Pat. No. 5,724,111 to Mizobata et al.

As to this type of display, light from the source enters the waveguide at an end face of the waveguide where the source is located. The light being diffused all over the waveguide diffracts on the hologram, the outcoming light evenly illuminates the liquid-crystal panel cells with the parameters of the mentioned holographic diffuser (time interval, the angular spectrum of diffracted waves) being set so that the outcoming beams move in a direction sufficiently close to the perpendicular to the display plane.

Such display will not operate in a reflective mode. As the incidence angle of the outside beam which has passed through the liquid-crystal panel is not optimal, it is necessary for the beam to cover the whole path twice going through all the diffusions and absorptions in the optical system so that it could come back to the location of the liquid-crystal display even if the light becomes diffracted on the hologram. Hence, the operating effectiveness of such display in the reflective mode is practically zero both if the incidence is oblique or perpendicular (which is inconvenient because that geometry requires the light source be behind the viewer).

SUMMARY OF THE INVENTION

The present invention is directed to both a system and a method of manufacturing of a universal display that is reflective and transmissive, and produces a quality image. The system and method use simple construction and manufacturing technology. A holographic universal display according to the present invention uses reflective lighting for a liquid-crystal panel. The system comprises at least two waveguide holograms in a matched configuration that redirects incident light beams as diffracted beams so that the beams passing out of the display are targeted towards the viewer. That is to say, light beams that are incident to the display at large angles, over a wide range, with respect to normal are redirected into a set, narrow range of angles close to the required angle for optimal viewing. The required angle for optimal viewing is nominally perpendicular to the plane of the display (i.e., normal), but is optionally selectable (by design of the holograms) to be an angle varies from the strict perpendicular.

Optionally, a holographic universal display according to the present invention also operates in the transmission mode with the side illumination generated by the special light source optically connected with the waveguide.

A display manufactured using this method comprises a liquid-crystal panel with multiple electrically-controlled transmission cells, and an illuminator block. The illuminator block includes an optical waveguide element that is as thick as at least several light waves, a first hologram on a first surface of the liquid-crystal panel, and a second hologram on a second side surface of the waveguide element. A light source is optically connected with the waveguide.

Following the method according to the present invention the first hologram transforms the incident beams being at a large angle (more than 20 degrees) with the waveguide mode, i.e. the waves that exist only in the waveguide and are fully reflected internally at its boundary. The second hologram is intended for the reproduction by such a waveguide mode that is excited during the diffraction on the first hologram. As a result of such diffraction the second hologram transforms the waveguide mode into an outcoming light wave that reaches the viewer's eye after passing through the liquid-crystal panel.

For holograms that are properly embodied according to the present invention, the incident light beam that has passed through a certain cell of the liquid-crystal panel is re-radiated, after the double diffraction by the holograms, so that it goes out of the display through the very cell through which it entered the panel. This hologram system compensates chromatic aberrations, i.e., dependence of the light wavelength on the diffraction angle and the illumination block used for the formation of the outcoming achromatic, i.e. white light.

This method enables utilization of liquid-crystal panels, including the color panels, both in the transmission and reflective modes, the reflective mode using the most comfortable configuration of the incident light—above and in front of the viewer and the normal view of the reflected light. This method enables us to produce the achromatic reflected light and, accordingly, use this techniques in the color liquid-crystal displays.

BRIEF DESCRIPTION OF THE DRAWINGS

Additional objects and advantages of the present invention will be apparent in the following detailed description read in conjunction with the accompanying drawing figures.

DETAILED DESCRIPTION OF THE INVENTION

Figure 1:
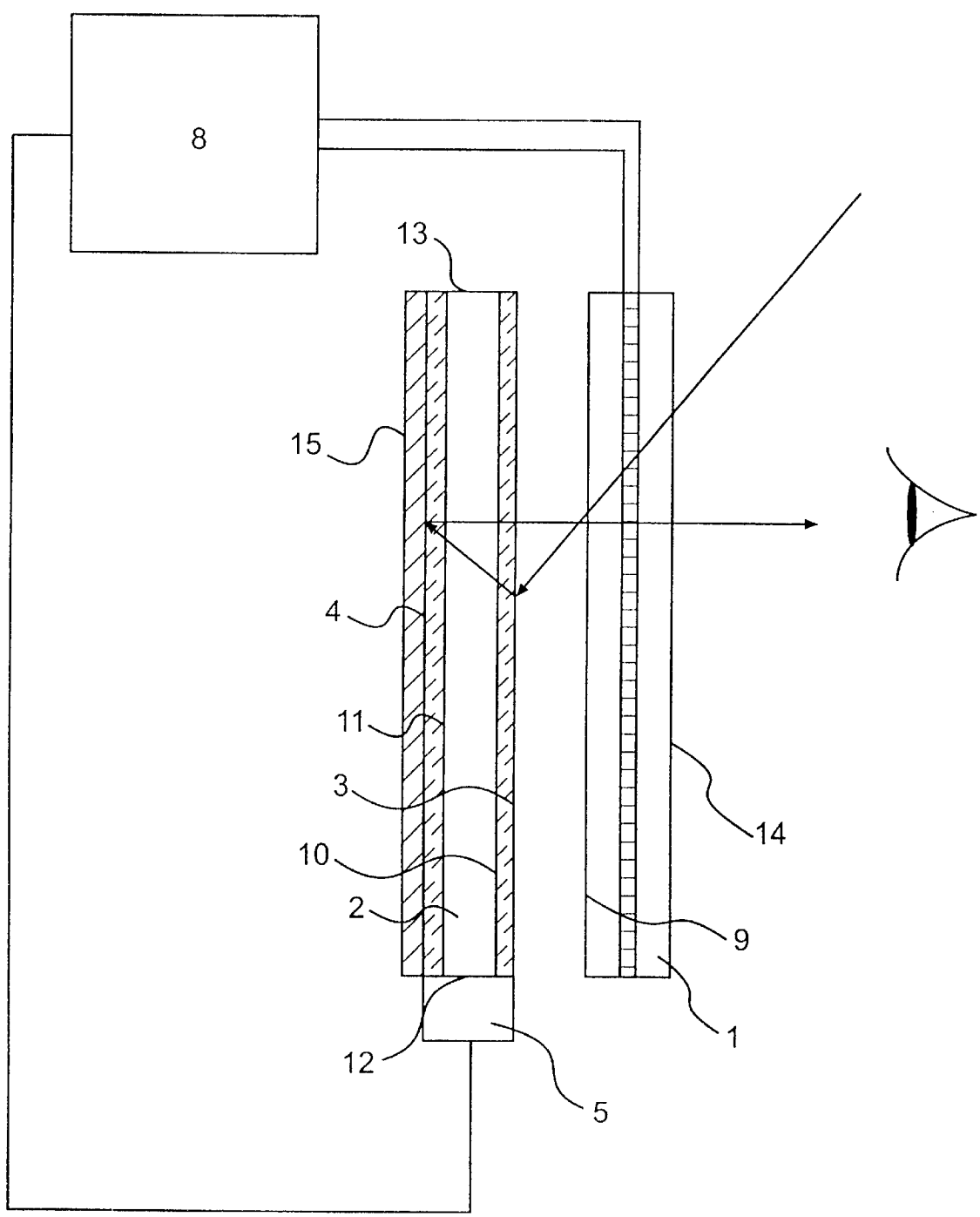
FIG. 1 illustrates a sectional view of a display accordance to a first embodiment of the present invention.
Figure 2:
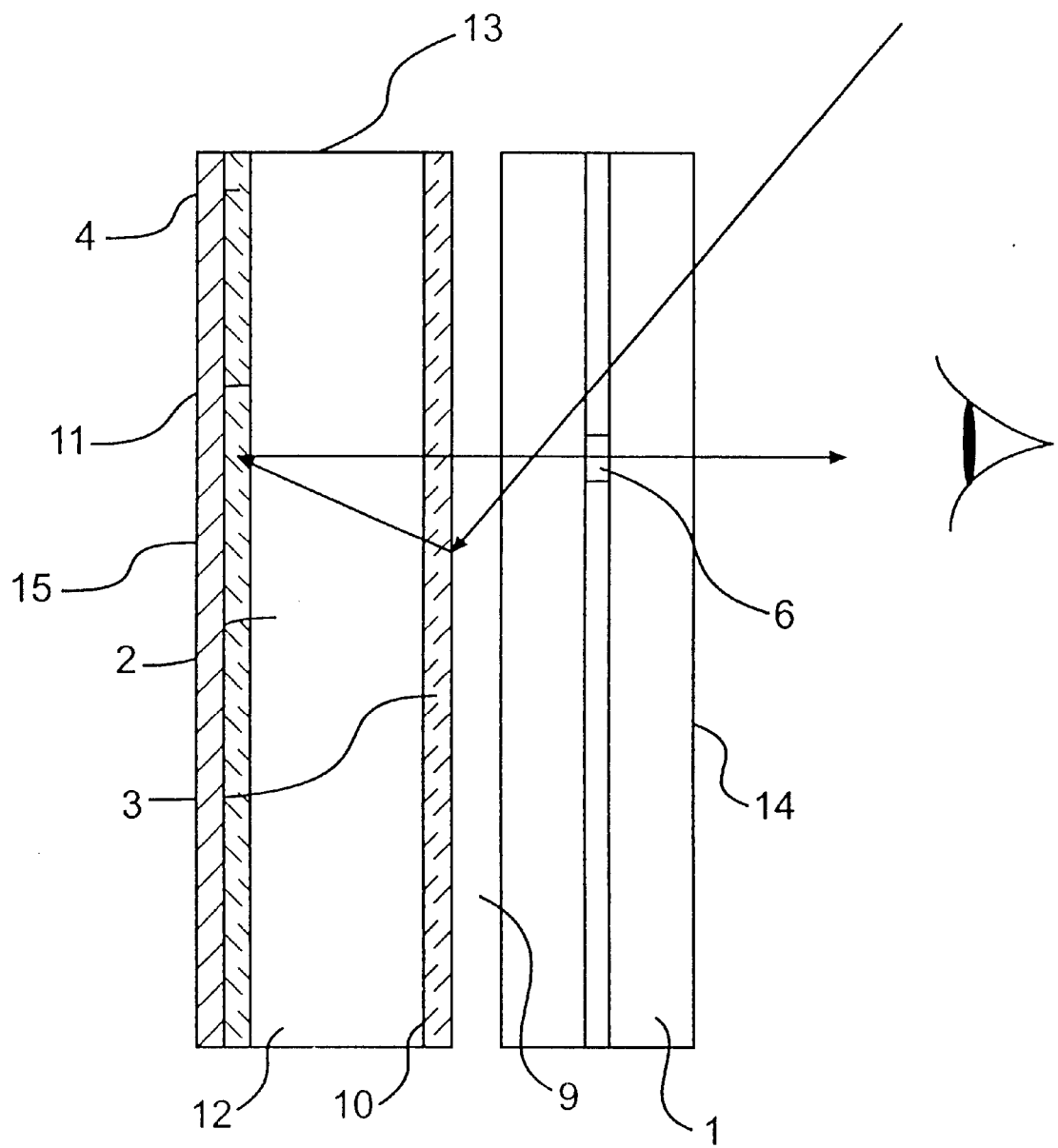
FIG. 2 illustrates reflective mode operation of a display according to an embodiment of the present invention with light coming from the viewer's direction.
Figure 3:
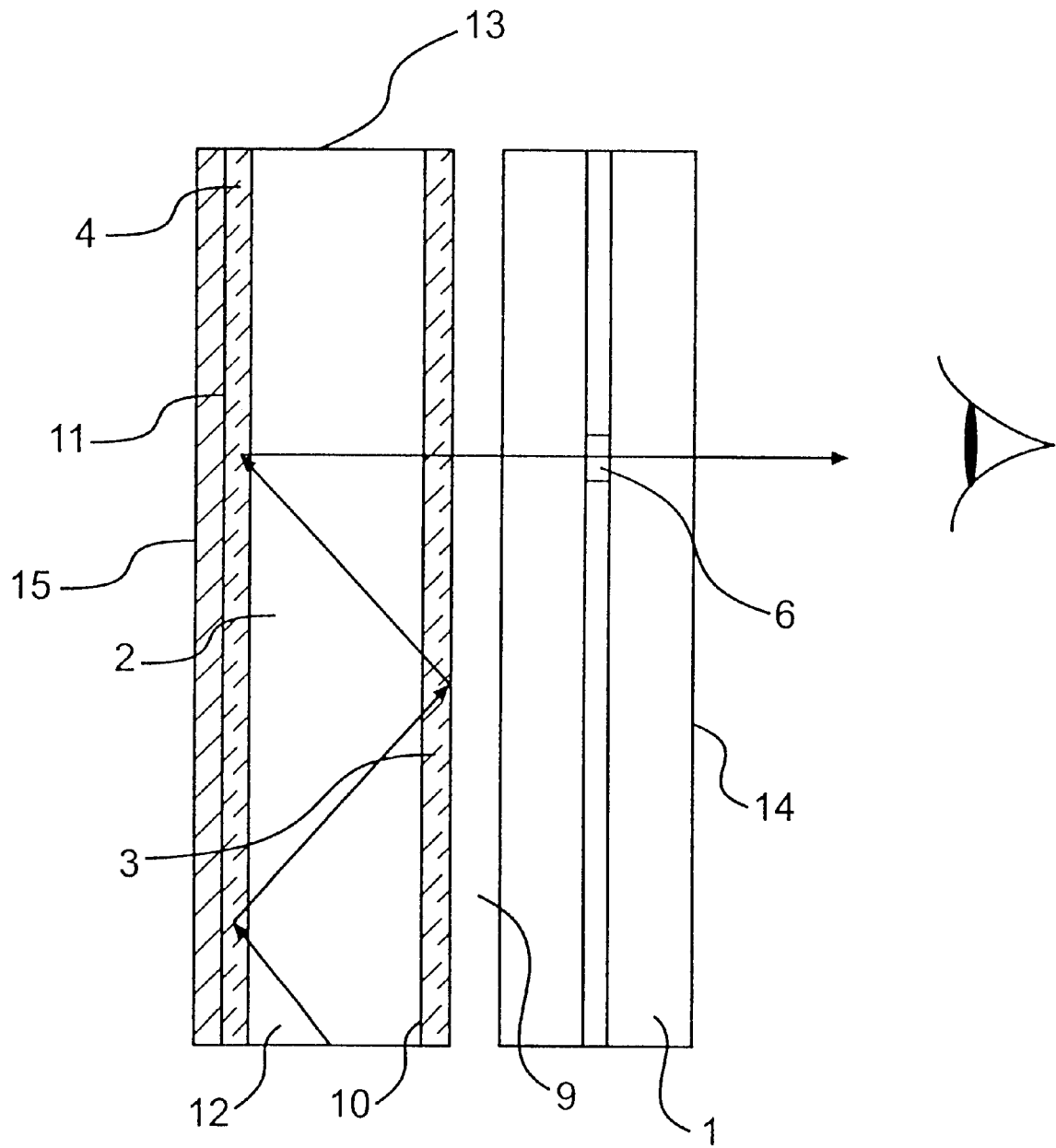
FIG. 3 illustrates reflective mode operation of a display according to an embodiment of the present invention with light coming into the waveguide.

Referring to FIGS. 1–3, a display according to an embodiment of the present invention is illustrated. The display has a liquid-crystal panel 1, an optical waveguide element 2, bearing a first hologram 3 and a second hologram 4 on its first and second side surfaces, and an electronic-controlled source of light 5 optically connected with the waveguide 2. The liquid-crystal panel is a transmissive light modulator (for ease of illustration, the drawing shows one cell only) with multiple liquid-crystal cells 6 controlled by the image forming circuit 8.

The optical waveguide 2 with the holograms 3, 4 and source of light 5 form the illuminator block for the lighting of the liquid-crystal cells from the back surface 9 of the panel 1.

The optical waveguide 2 is preferably a plate made out of an optically translucent material with the polished first side surface 10 and second side surface 11 as well as the end-faces 12, 13.

The source of light 5 can contain an incandescent lamp, glow-discharge lamp or three groups of LED (red, green and blue). The mentioned source of light is optically connected with the waveguide from the end-face 12 and controlled by the image electronics 8.

The hologram 3 is located on the waveguide surface 10. The hologram 4 is located on another side surface 11 of the optical waveguide and equipped with the additional diffusory reflective coating 15, for example, diffusory metal layer so that the light which has passed through the holograms 3, 4 could come back to the optical system undiffracted. The diffraction efficiency of the holograms is inhomogeneous in terms of square. The diffraction efficiency of the hologram 3 decreases from the end-face 12 to the end-face 13. Just the other way round, the efficiency of the hologram 4 grows from the end-face 12 to the end-face 13.

The mentioned display operates in the following modes:
Reflective;
Transmission; and
Mixed.

When the display is set in the reflective mode, the electronic block 8 applies a signal to the suitable liquid-crystal cells transforming them into the translucent or opaque state. It does not signal to switch the source of light 5. The light from the external source (which can be the sun, incandescent lamps, luminescent lamps or diffused light) coming from the face of the liquid-crystal panel 14 at the set spectrum of angles goes through the open cells and diffracts on hologram 3. The light diffracted on the hologram 3 is a waveguide mode that becomes scattered in the optical waveguide 2 and is fully reflected internally on the boundaries of the waveguide element 10 and 11.

Figure 4:
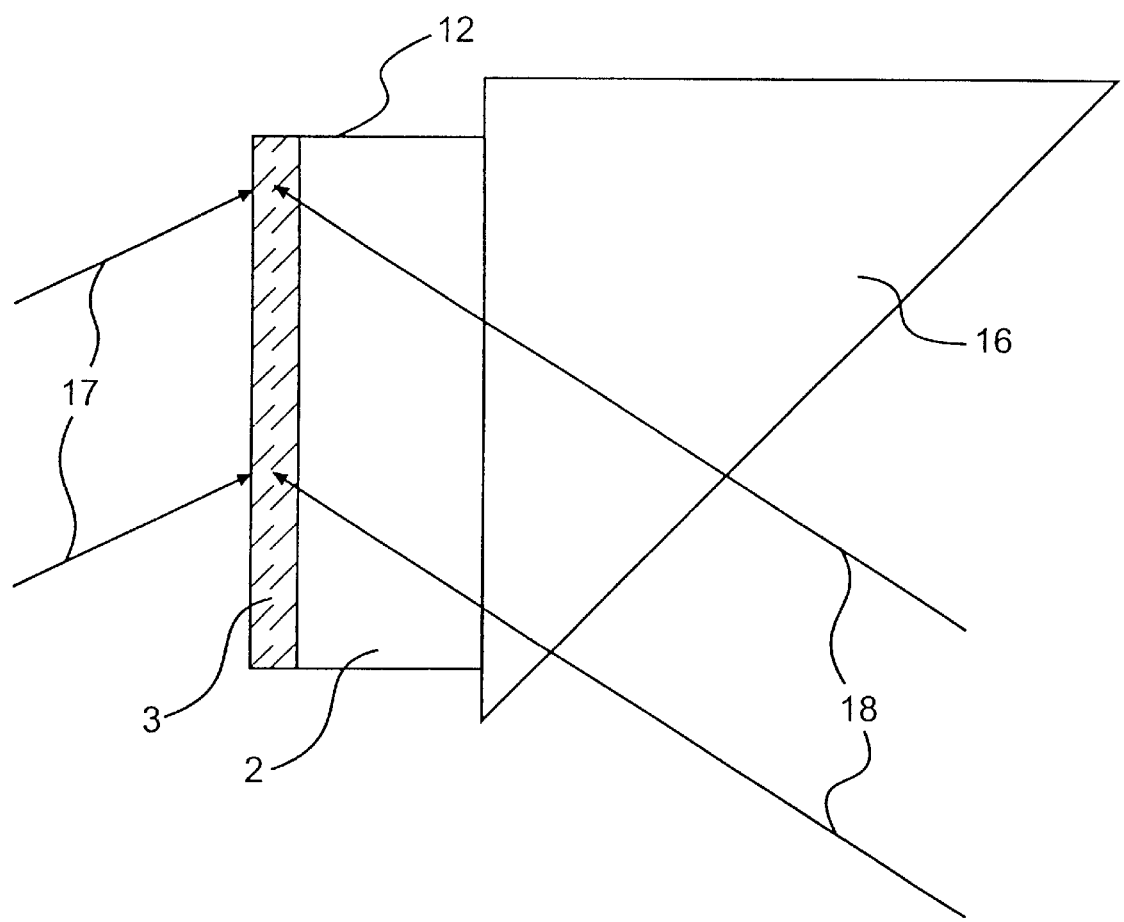
FIG. 4 illustrates an appropriate recording scheme for a waveguide hologram for use in implementing the present invention.

Referring to FIG. 4, an approximate recording scheme for the waveguide hologram 3 is illustrated. In order to form a properly configured hologram (orientation, lattice constant and the form of wave-fronts) we use a suitably sized prism 16 out of the optically translucent material with a refractive index no smaller than that of the waveguide material. Using the immersion oil this prism is pressed by the waveguide 2 with a recording medium applied to its surface. The incident laser beam 18 coming from the waveguide forms a reference beam. The object beam is formed by the beam 17 coming from the air at the angle corresponding to the required spectrum of the radiation entry angles in the conditions of external backlighting.

Passing through the waveguide the light beam that has diffracted on the hologram 3 falls on the hologram 4. The hologram 4 transforms the incident waveguide mode into the outcoming wave that spreads close or perpendicular to the waveguide plane. Hence, the original incident light being at the large angles with the perpendicular of the liquid-crystal panel 1 comes out close or perpendicular to the panel after passing through the illuminator block. This is the way to achieve comfortable perception formed by the display.

The total diffraction efficiency of the holograms 3, 4 in the optional point is kept constant due to the inhomogeneous diffraction efficiency in terms of square. The dependence of the light departure angle on the light wave length in the sequential diffraction on the holograms 3, 4 is significantly weaker than the similar dependence taken separately for each hologram. This happens because the last reflection for each hologram have different signs, and in the sequential diffraction the chromatic aberrations, i.e. the dependence of the light departure angle on the light wave length, become compensated.

Transmission Mode

When the display is set in the transmission mode, the electronic block 8 applies a signal to the suitable liquid-crystal cells transforming them into the translucent or opaque state. It also does signal to switch the source of light 5. The light from the source 5 gets into the waveguide 2, spreads from the end-face 12 to the end-face 13 due to the full internal reflection effect, diffracts on the hologram 4 and departs from the waveguide 2. The light that has not diffracted on the hologram while remaining inside the waveguide and showing multiple reflections on the lateral faces again becomes fully reflected internally and re-diffracts on the other areas of the hologram 4. Due to the increase in the diffraction efficiency the brightness of the departing light is constant all over the square of the display. The hologram 3 is intended for the transformation of the external light. If reproduced by the waveguide mode it does not operate effectively. The diffracted part of the waveguide mode becomes reflected from the diffuser 15 providing an additional backlighting of the liquid-crystal panel 1.

Mixed Mode

This mode is a combination of 1-st and 2-nd modes that adds back-lit illumination in the event of non-convenient or week brightness of external illumination.

The display can be used for the monitors, indicators of the home appliances, information boards, computer monitors and TV receivers.

Figure 5:
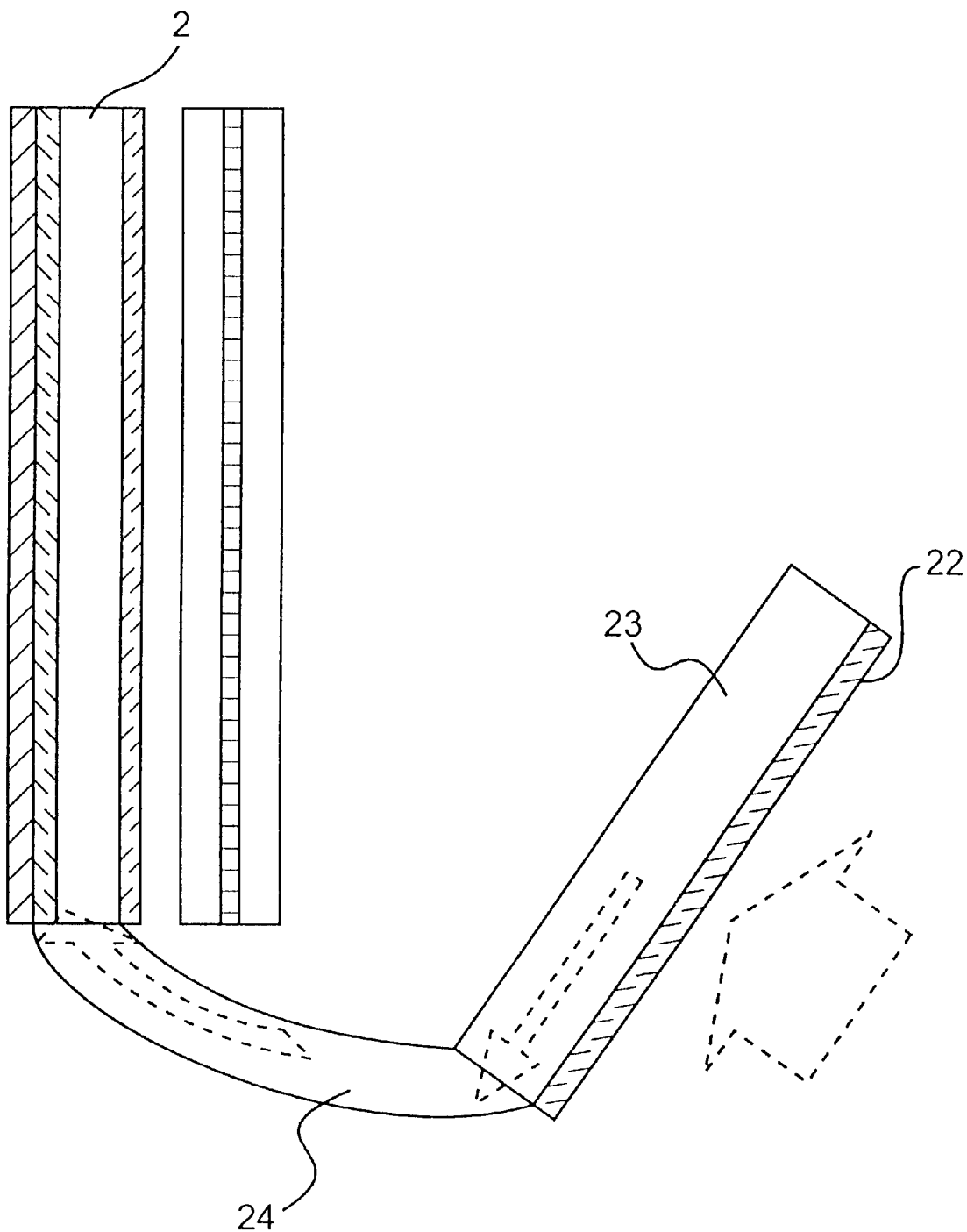
FIG. 5 illustrates a display according to an alternate embodiment of the present invention wherein illumination is facilitated via a waveguide light collector.

Referring to FIG. 5, an embodiment that uses illumination is illustrated. This approach includes a waveguide light collector 23 having a hologram 22 for directing light into the waveguide 23 and through a light pipe 24 into waveguide 2.

Figure 6:
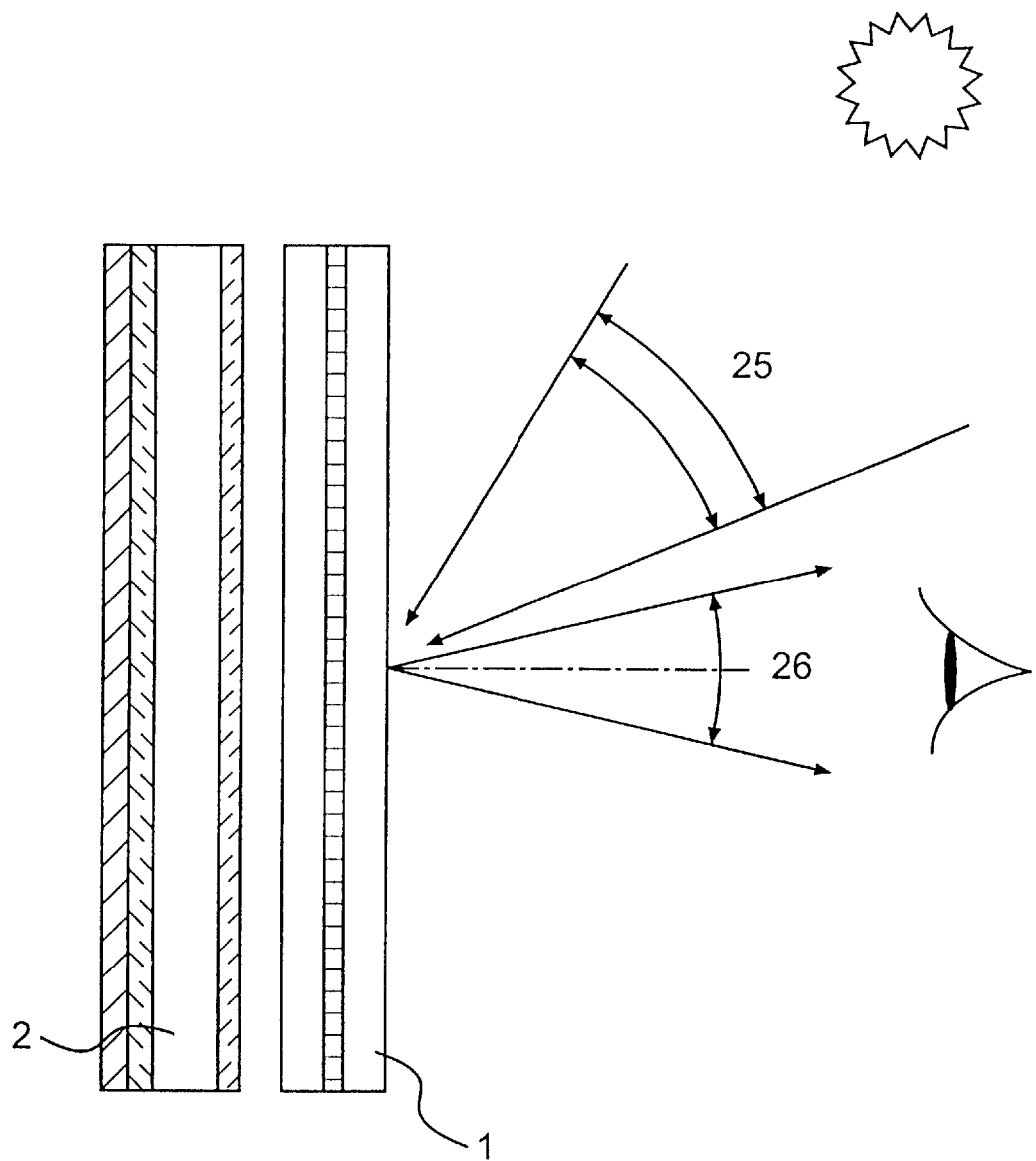
FIG. 6 illustrates conceptually the configuration of relative patterns of incident light angular range with respect to outgoing light angular range, according to operation of a display embodied according to the present invention.

Referring to FIG. 6, operation of incident light and outgoing light configuration is illustrated. An illumination source provides incoming light over a range of angles 25 to the LCD 1. Light is reflected to the user over a more narrow set of angles 26.

Figure 7:
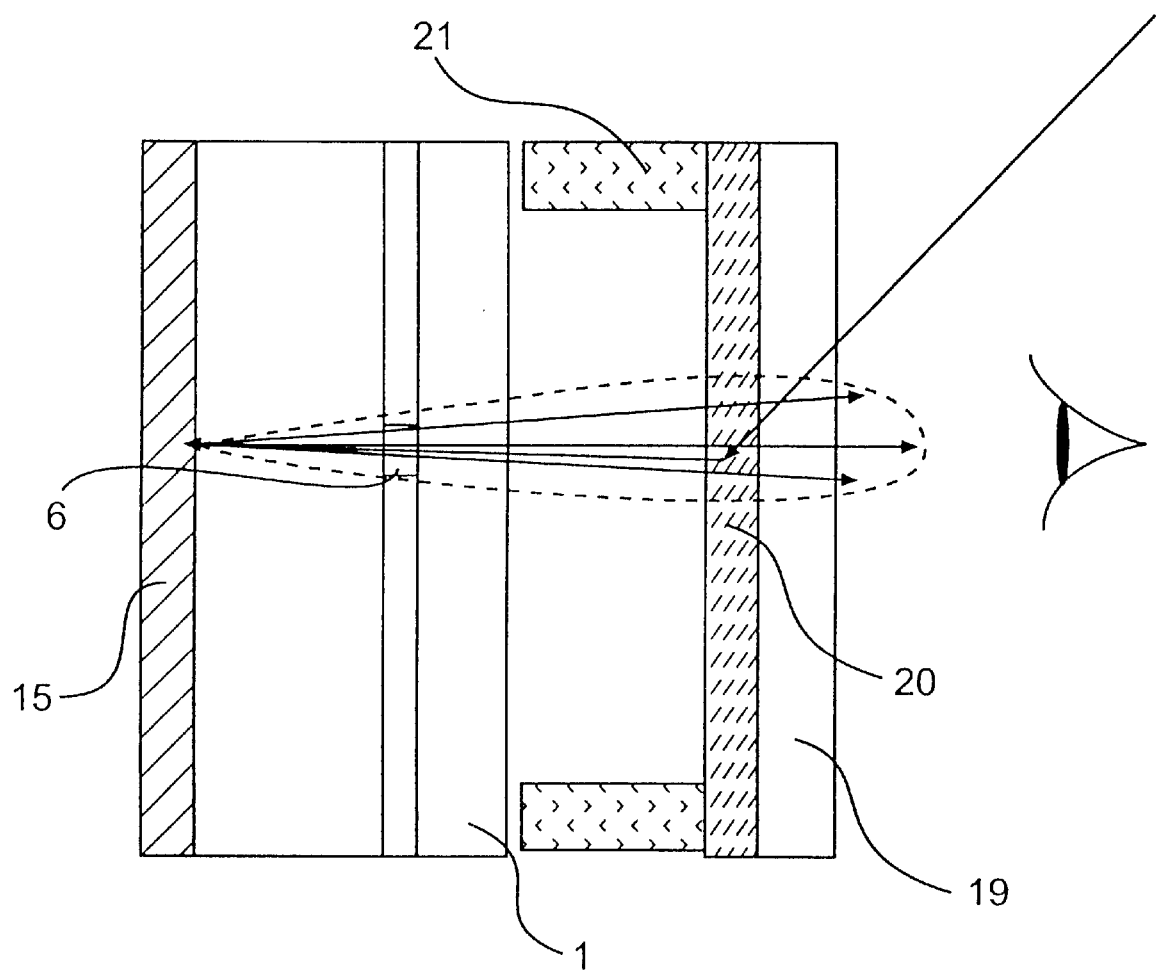
FIG. 7 illustrates an add-on holographic screen for light collection.

Referring to FIG. 7, an add-on holographic screen embodiment for light collection is illustrated. Add-on optical element 19 comprises a hologram 20 for directing light onto diffuser 15. Light is then reflected back through LCD 1 where it illuminates each cell of the LCD (here indicated as a single cell 6). Spacers 21 provide the correct distance from LCD 1 and protect the LCD 1 from damage.

Construction of a universal reflective and transmission device for the lighting of the liquid-crystal panel according to the present invention has a number of significant features. The system uses at least two waveguide holograms and matching to provide a configuration of the incident and diffracted beams so as to direct the beams passing there through towards the viewer as targeted. That is to say, the beams being incident at a large angle (the set spectrum of angles being wide) with respect to a direction perpendicular to the display, such as incident beams between about 25 degrees and 65 degrees from the direction perpendicular to the display, are re-directed into a set (narrow) spectrum of angles close to the display perpendicular, such as within about 15 degrees of the direction perpendicular to the display. Optionally, the light is re-directed into a narrow spectrum (i.e., within about 15 degrees) at a, designated angle for the viewing that is other than perpendicular to the plane of the display. A display embodied according to the present invention can also operate in the transmission mode with side illumination generated by a light source optically connected with the waveguide of the light block.

A display manufactured using the method as described above and operating both in the transmission and reflective modes (or reflective alone) has a liquid-crystal panel with multiple electricity-controlled transmission cells, and an illuminator block which, in turn, includes an optical waveguide element as thick as at least several light waves, a first hologram on a first surface adjacent the liquid-crystal panel, and a second hologram on a second surface of the waveguide element. For the transmission mode, a light source is optically connected with the waveguide.

The system operates by forming illumination on a transparent display comprising a liquid crystal panel, with a series of transparent cells, having front and back surfaces. Illumination is effected by a transparent optical wafer (waveguide) having front and back surfaces, first and second edges, a first hologram situated on the front surface of the wafer, a second hologram and a reflecting layer situated on the back surface of the wafer.

The system further operates by transmitting light from an external light source through the cells of the LCD panel, the light source illuminating the first hologram by transmitted light and diffraction of it, with coupling of light power into the wafer (waveguide), and propagation of this light through the wafer (waveguide) due to the total internal reflection on both sides of wafer. Diffraction of the waves on the second hologram and outward transmission of diffracted light in a predetermined direction for backlighting of the LCD panel (the major part of reflected outgoing light is outgoing in the same cell that it was incident) occurs, while at the same time illuminating light waves are coupled from the illumination source to the edge of the wafer, and a first part of optical waves are diffracted on the second hologram and coupling out from wafer with illuminating of the LCD panel into its back surface. A second part of coupled light is diffracted on the first hologram (with low diffraction efficiency) with a part of the light being coupled out. Light is reflected from the reflection coating on the second hologram, thus forming some additional backlit illumination of LCD panel.

An additional aspect of the invention is that diffraction efficiency for each of the first and second holograms is non-uniform across their surfaces. In addition, the first hologram has an increasing and the second hologram has a decreasing diffraction efficiency along the direction of light propagation illuminated from illumination sources. Further, the sum of the local diffraction efficiencies of the two holograms is constant all across the surface of the wafer.

According to the present invention the first and second holograms are recorded in such a way, that they compensates for one another's chromatic dispersion. The system further allows non-diffracted light coupled from illuminating sources to propagate along the waveguide and be diffracted at another part of the holograms, that is the light performance efficiency increases.

According to an alternate embodiment, the illuminating source is embodied as a waveguide holographic light collector (that is preferably disposed on the protection cover of display) and a flexible waveguide. The light flexible waveguide connects the light collector with edge of the wafer.

The present invention has been described in terms of preferred embodiments, however, it will be appreciated that various modifications and improvements may be made to the described embodiments without departing from the scope of the invention.

What is claimed is:

1. A display for visual representation of images, the display comprising:
   a liquid-crystal array; and
   an illuminator block disposed adjacent the liquid crystal array in optical communication therewith, wherein the illuminator block comprises:
   an optical waveguide having a first surface adjacent the liquid crystal array and a second surface, the first and second surfaces being disposed on opposed sides of the optical waveguide,
   a first hologram on the first surface,
   a second hologram on the second surface, and
   a diffusory reflective coating adjacent said second hologram on a side opposite said optical waveguide,
   wherein the first and second holograms each have a diffraction efficiency that is non-uniform across the surface of the illuminator.

2. The display of claim 1, wherein the liquid-crystal array comprises multiple electrically-controlled transmission cells.

3. The display of claim 1, further comprising:
   a light source optically connected with the optical waveguide.

4. The display of claim 1, wherein said diffusory reflective coating is a diffusive metal layer.

5. A display for visual representation of images at a predefined angle for optimum viewing, the display comprising:
   a liquid-crystal array; and
   an illuminator block disposed adjacent the liquid crystal array in optical communication therewith, wherein the illuminator block comprises an optical waveguide, a pair of matched holograms, and a diffusory reflective coating, wherein a first of said matched holograms is on a surface of said optical waveguide adjacent the liquid crystal array, a second of said matched holograms is on a surface of said optical waveguide opposite the liquid crystal array, and the diffusory reflective coating is adjacent said second of said matched holograms on a side opposite said optical waveguide;
   wherein said matched holograms are selected such that they diffract light beams that are incident to the display at angles in a first range about 25 degrees to about 65 degrees from the predefined angle for optimum viewing are redirected into a second range of angles that are substantially similar to the predefined angle for optimal viewing, and
   wherein each one of the pair of matched holograms has a diffraction efficiency that is non-uniform across the surface of the illuminator.

6. The display of claim 5, wherein the sum of the diffraction efficiencies of the pair of matched holograms is constant at any given point across the surface of the illuminator.

7. A display for visual representation of images at a predefined angle for optimum viewing, the display comprising:
   a liquid-crystal array; and
   an illuminator block disposed adjacent the liquid crystal array in optical communication therewith, wherein the illuminator block comprises an optical waveguide, a pair of matched holograms, and a diffusory reflective coating, wherein a first of said matched holograms is on a surface of said optical waveguide adjacent the liquid crystal array, a second of said matched holograms is on a surface of said optical waveguide opposite the liquid crystal array, and the diffusory reflective coating is adjacent said second of said matched holograms on a side opposite said optical waveguide;
   wherein said matched holograms are selected such that they diffract light beams that are incident to the display at angles in a first range that are substantially different from the predefined angle for optimum viewing are redirected into a second range of angles that are substantially similar to the predefined angle for optimal viewing, and wherein each one of the pair of matched holograms has a diffraction efficiency that is non-uniform across the surface of the illuminator.

8. The display of claim 7, wherein the sum of the diffraction efficiencies of the pair of matched holograms is constant at any given point across the surface of the illuminator.

* * * * *